(12) United States Patent
Chen

(10) Patent No.: US 6,578,859 B2
(45) Date of Patent: Jun. 17, 2003

(54) GARDENING WORKING VEHICLE STRUCTURE

(76) Inventor: Vic Chen, No. 129 Yuan Lu Rd., Sec 1, Chiao Shu Tsun, Pu Yen Hsiang Changhua Hsien (TW)

(*) Notice: Subject to any disclaimer, the term of this patent is extended or adjusted under 35 U.S.C. 154(b) by 43 days.

(21) Appl. No.: 09/984,479

(22) Filed: Oct. 30, 2001

(65) Prior Publication Data
US 2003/0080524 A1 May 1, 2003

(51) Int. Cl.⁷ .................................................. B62M 1/00
(52) U.S. Cl. ................. 280/87.01; 280/32.5; 297/423.1
(58) Field of Search ........................... 280/87.01, 32.5, 280/32.6, 32.7, 87.021, 79.2, 47.38; 297/423.1, 423.11, 423.12, 423.13, 344.22; 296/63, 65.01

(56) References Cited

U.S. PATENT DOCUMENTS

| | | | | |
|---|---|---|---|---|
| 1,745,562 A | * | 2/1930 | Taicher | 280/32.5 |
| 2,033,037 A | * | 3/1936 | Lang | 280/62 |
| 2,126,698 A | * | 8/1938 | Eck | 280/87.021 |
| 2,501,976 A | * | 3/1950 | Vitek | 297/344.18 |
| 2,816,772 A | * | 12/1957 | Lapointe | 280/87.01 |
| 3,285,555 A | * | 11/1966 | Bevington | 248/188.7 |
| 3,312,477 A | * | 4/1967 | Dirksen | 280/32.5 |
| 3,515,432 A | * | 6/1970 | Sporman | 297/344.18 |
| 4,632,410 A | * | 12/1986 | Bainbridge et al. | 280/32.5 |
| D321,796 S | * | 11/1991 | Forrand | D6/330 |
| 5,135,243 A | * | 8/1992 | Carpenter | 280/7.14 |
| 6,116,183 A | * | 9/2000 | Crow et al. | 114/363 |
| 6,302,413 B1 | * | 10/2001 | Comeaux | 280/32.5 |
| 6,361,111 B1 | * | 3/2002 | Bowers et al. | 297/344.22 |
| 2001/0013717 A1 | * | 8/2001 | Bowers et al. | 297/344.22 |

* cited by examiner

Primary Examiner—Brian L. Johnson
Assistant Examiner—J. Allen Shriver
(74) Attorney, Agent, or Firm—Rosenberg, Klein & Lee

(57) ABSTRACT

A gardening working vehicle structure including a vehicle frame, two wheels, and a seat frame. The vehicle frame is provided with two wheels to move the vehicle frame horizontally. The vehicle frame has a seat tube extending outward. A retractable rod is adjustably mounted in the seat tube and has an annular stop flange to support a seat frame which has a horizontal support portion, and a vertical backrest portion. The support portion is provided with a mounting tube which is rested on the stop flange of the retractable rod, so that the seat frame may be rotated on the retractable rod freely.

5 Claims, 6 Drawing Sheets

GARDENING WORKING VEHICLE STRUCTURE

BACKGROUND OF THE INVENTION

1. Field of the Invention

The present invention relates to a gardening working vehicle structure, and more particularly to a gardening working vehicle structure having a seat frame whose height may be adjusted so as to fit users of different statures, thereby enhancing the versatility of the gardening working vehicle structure.

2. Description of the Related Art

Usually, a gardener may be seated on a chair, a stool or the like to proceed the gardening work during a long period of time. However, the height of the stool is fixed and cannot be adjusted, so that the stool cannot fit users of different statures, thereby causing inconvenience to users of larger statures. In addition, when the user wishes to move to another position in the garden, he has to stand up and move the stool to the destined position, thereby causing inconvenience to the user. Further, the user may put on a sunshade cap whose sunshade effect is very poor, so that the user easily feels uncomfortable when working under the sunshine.

SUMMARY OF THE INVENTION

The primary objective of the present invention is to provide a gardening working vehicle structure having a seat frame whose height may be adjusted so as to fit users of different statures, thereby enhancing the versatility of the gardening working vehicle structure.

Another objective of the present invention is to provide a gardening working vehicle structure having a seat frame that may be rotated on the retractable rod freely, so that the user may turn around freely to take his tool or article, thereby greatly increasing convenience of work.

A further objective of the present invention is to provide a gardening working vehicle structure having a seat frame that may be provided with a support tube so that a support rod of a sunshade umbrella may be inserted into the support tube of the seat frame, thereby providing a sunshade effect to the user during work.

In accordance with the present invention, there is provided a gardening working vehicle structure, comprising a vehicle frame, two wheels, and a seat frame, wherein:

the vehicle frame has two ends each respectively provided with a wheel that may be rotated to move the vehicle frame horizontally, the vehicle frame has a top face provided with a seat tube extending outward, a retractable rod is adjustably mounted in the seat tube of the vehicle frame, a quick release set is mounted on an outer periphery of a top portion of the seat tube of the vehicle frame for clamping and releasing the retractable rod, the retractable rod is formed with an annular stop flange for supporting a seat frame;

the seat frame is mounted on the retractable rod, and has a first section formed with a horizontal support portion, and a second section formed with a vertical backrest portion, the support portion of the seat frame is provided with a mounting tube which is mounted on a top portion of the retractable rod and rested on the stop flange of the retractable rod, so that the seat frame may be rotated on the retractable rod freely.

Further benefits and advantages of the present invention will become apparent after a careful reading of the detailed description with appropriate reference to the accompanying drawings.

DETAILED DESCRIPTION OF THE INVENTION

Figure 1:
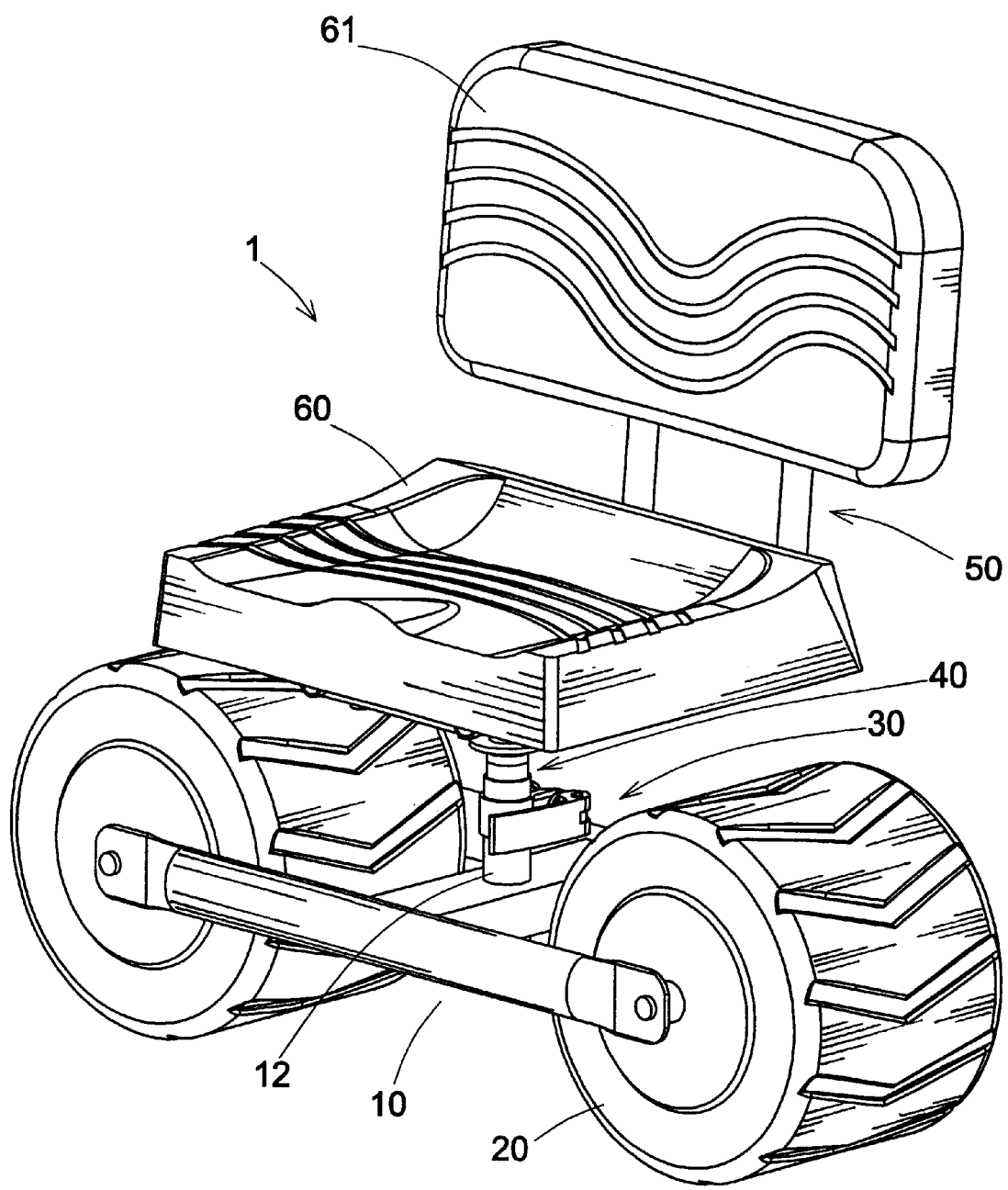
FIG. 1 is a perspective view of a gardening working vehicle structure in accordance with a preferred embodiment of the present invention.
Figure 2:
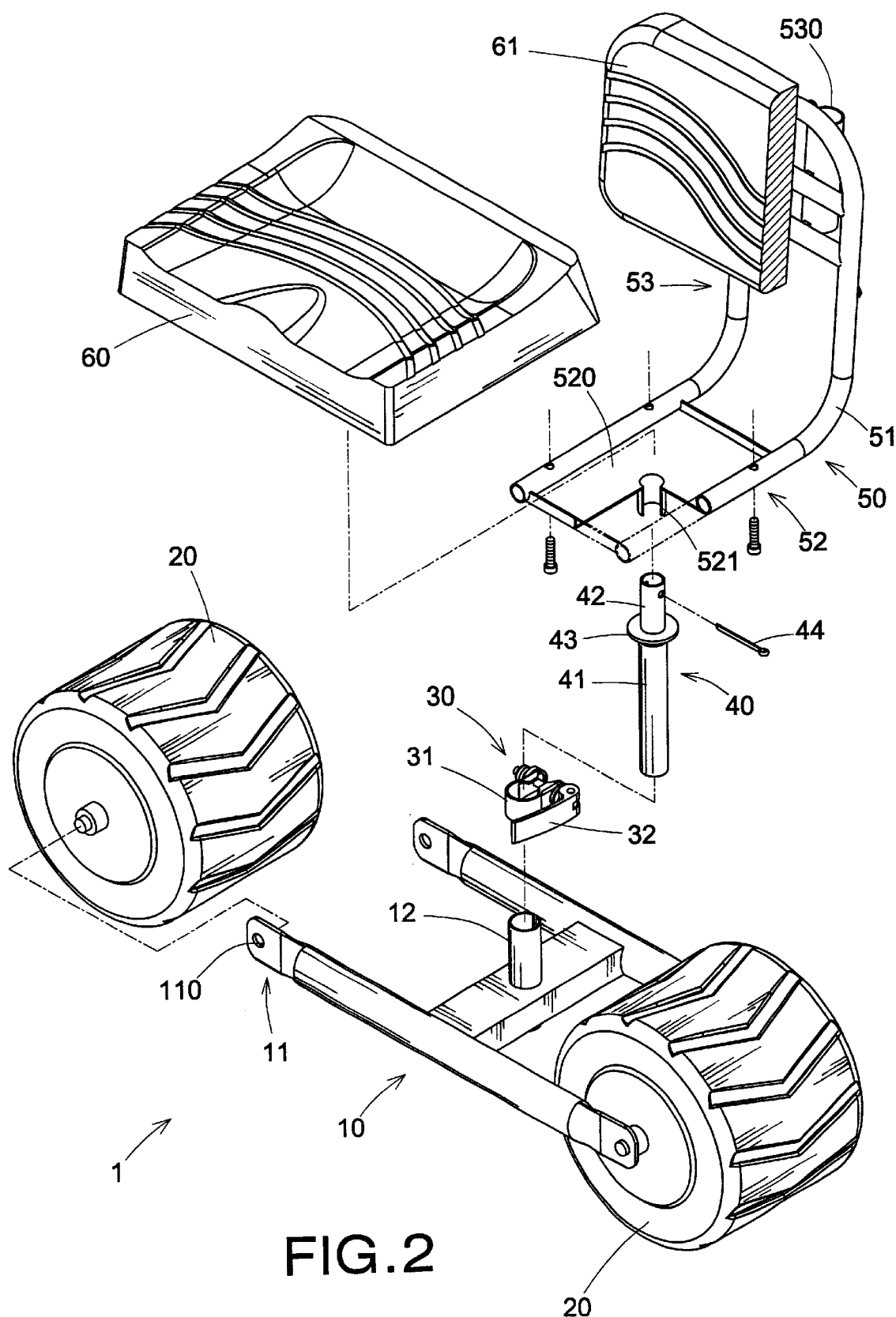
FIG. 2 is an exploded perspective view of the gardening working vehicle structure as shown in FIG. 1.

Referring to the drawings and initially to FIGS. 1 and 2, a gardening working vehicle structure 1 in accordance with a preferred embodiment of the present invention comprises a vehicle frame 10, two wheels 20, and a seat frame 50.

The vehicle frame 10 has two ends respectively provided with two opposite pivot portions 11 each formed with a pivot hole 110. Two wheels 20 are provided, and each of the two wheels 20 is rotatably mounted between two opposite pivot portions 11 of the vehicle frame 10, so that the vehicle frame 10 may be moved horizontally. Each of the two wheels 20 has a center provided with a shaft whose two ends are mounted in the pivot holes 110 of the pivot portions 11 of the vehicle frame 10, so that the two wheels 20 may be rotatably mounted between the two ends of the vehicle frame 10. The vehicle frame 10 has a top face provided with a seat tube 12 extending outward.

A quick release set 30 is mounted on a top portion of the seat tube 12. The quick release set 30 includes a clamping tube 31 mounted on an outer periphery of the seat tube 12, and a snapping member 32 mounted on the clamping tube 31 for clamping the clamping tube 31 on the seat tube 12.

A retractable rod 40 is adjustably mounted on the seat tube 12, and has a first end formed with a first insertion portion 41 inserted into the seat tube 12 of the vehicle frame 10, and has a second end formed with a second insertion portion 42. The retractable rod 40 is formed with an annular stop flange 43 located between the first insertion portion 41 and the second insertion portion 42.

The seat frame 50 is mounted on the retractable rod 40, and includes a tube body 51 that is bent into an inverted U-shaped frame. The tube body 51 of the seat frame 50 has a first section formed with a horizontal support portion 52, and a second section formed with a vertical backrest portion 53. A seat pad 60 is secured on the support portion 52. A backrest pad 61 is secured on a first side of the backrest portion 53, and a support tube 530 is secured on a second side of the backrest portion 53 of the seat frame 50.

A base plate 520 is secured on the support portion 52 of the tube body 51 of the seat frame 50, and is provided with a mounting tube 521 which is mounted on an outer periphery of the second insertion portion 42 of the retractable rod 40, so that the bottom of the mounting tube 521 of the base plate 520 of the seat frame 50 is rested on the stop flange 43 of the retractable rod 40.

Figure 5:
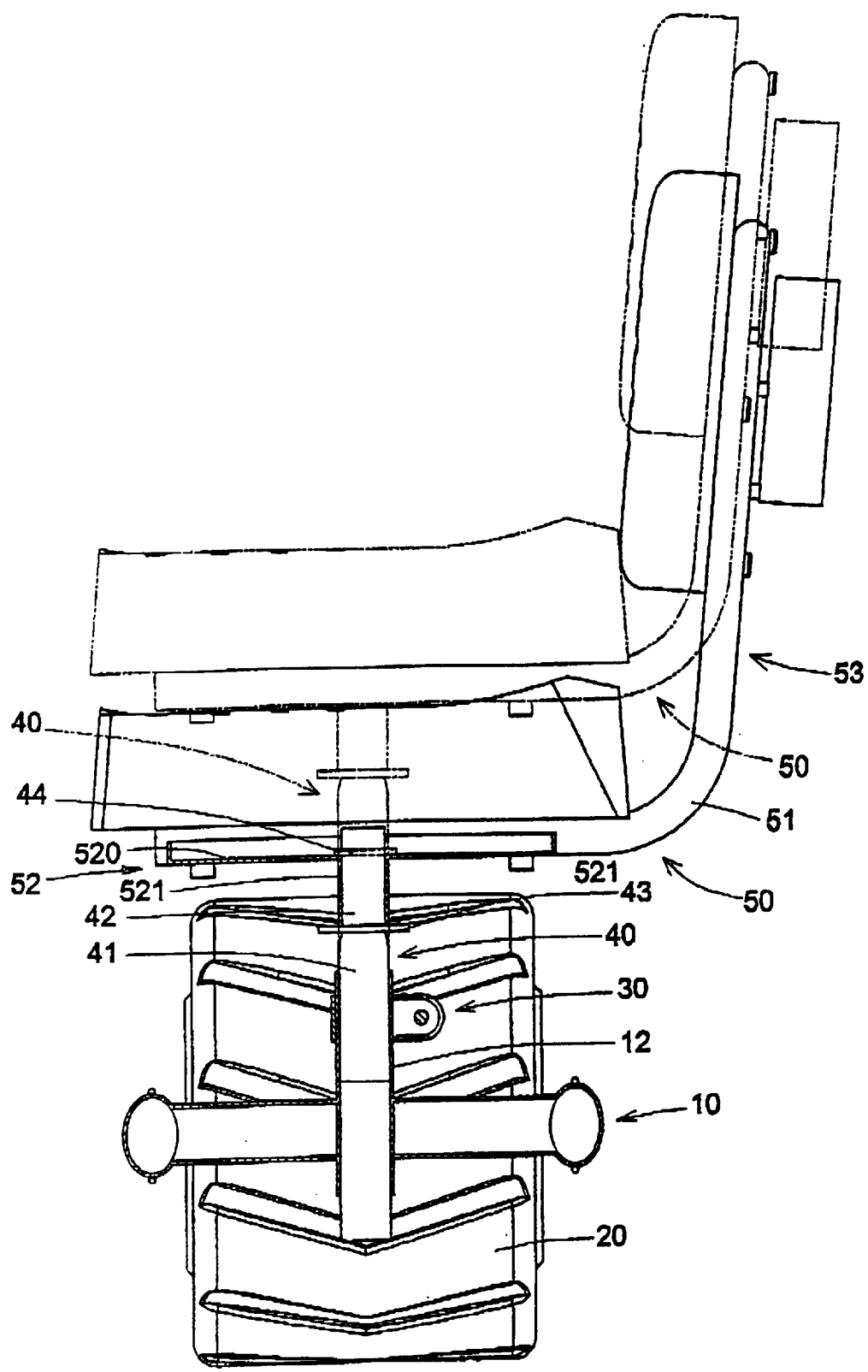
FIG. 5 is a schematic side plan operational view of the gardening working vehicle structure as shown in FIG. 1 in use.

A positioning pin 44 is extended through an upper portion of the second insertion portion 42 of the retractable rod 40, and is rested on a top face of the base plate 520 of the seat frame 50, so that the mounting tube 521 of the base plate 520 of the seat frame 50 is retained between the stop flange 43 of the retractable rod 40 and the positioning pin 44 as shown in FIG. 5. Thus, the seat frame 50 may be rotated freely on the retractable rod 40.

Figure 3:
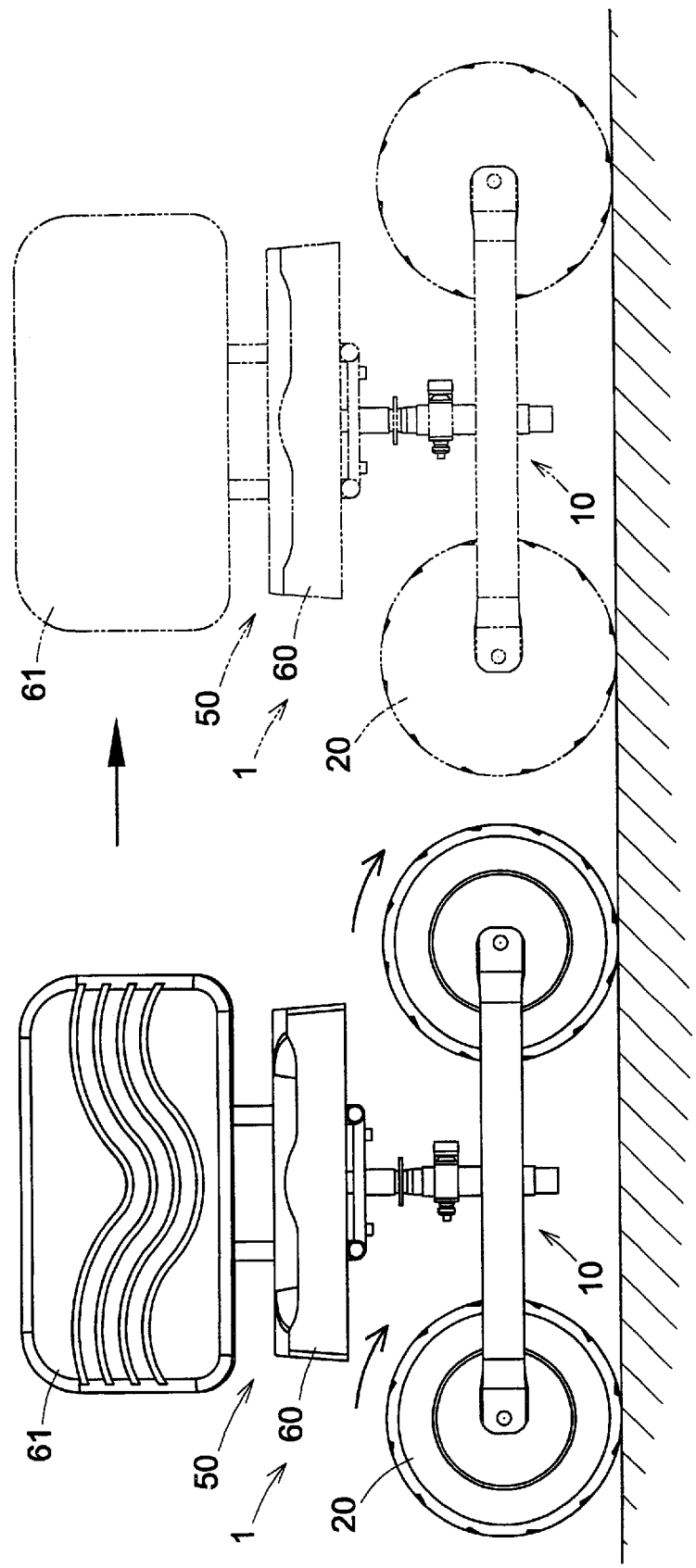
FIG. 3 is a schematic front plan operational view of the gardening working vehicle structure as shown in FIG. 1 in use.

As shown in FIG. 3, the user may be seated on the seat pad 60 of the seat frame 50, and may move the gardening working vehicle structure 1 freely by his feet, so that the user may be seated on the gardening working vehicle structure 1 to move to any position in the garden freely and easily, without having to stand up, thereby facilitating the user proceeding the gardening work.

Figure 4:
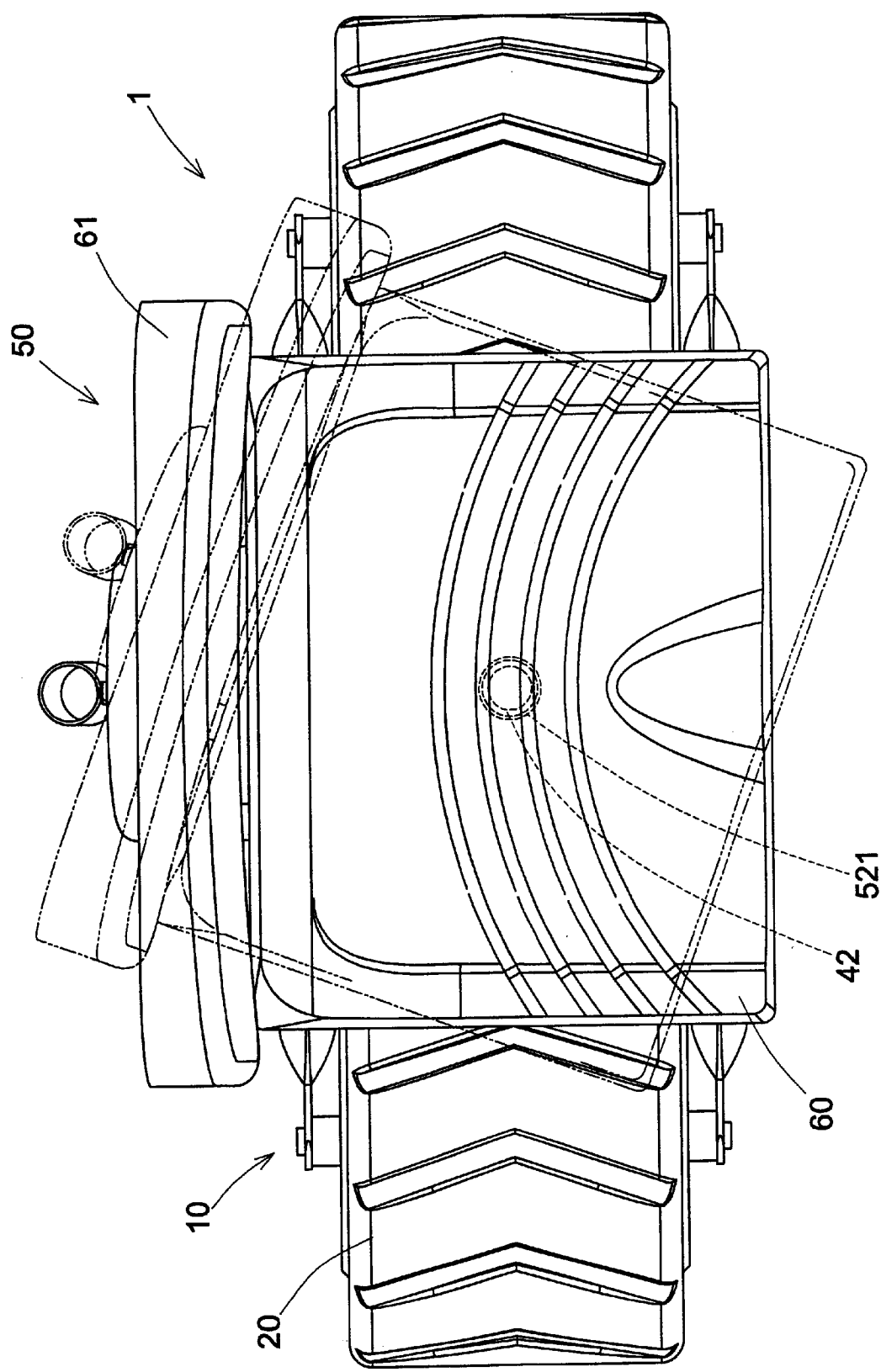
FIG. 4 is a schematic top plan operational view of the gardening working vehicle structure as shown in FIG. 1 in use.

As shown in FIG. 4, the mounting tube 521 of the base plate 520 of the seat frame 50 is rotatably mounted on the second insertion portion 42 of the retractable rod 40, so that the seat frame 50 may be rotated on the retractable rod 40 freely. Thus, the user may turn around freely to take his tool or article, thereby greatly increasing convenience of work.

As shown in FIG. 5, the first insertion portion 41 of the retractable rod 40 is adjustably mounted in the seat tube 12 of the vehicle frame 10 by the quick release set 30, so that the first insertion portion 41 of the retractable rod 40 may be moved upward and downward to adjust the height of the seat frame 50 so as to fit users of different statures, thereby enhancing the versatility of the gardening working vehicle structure 1.

Figure 6:
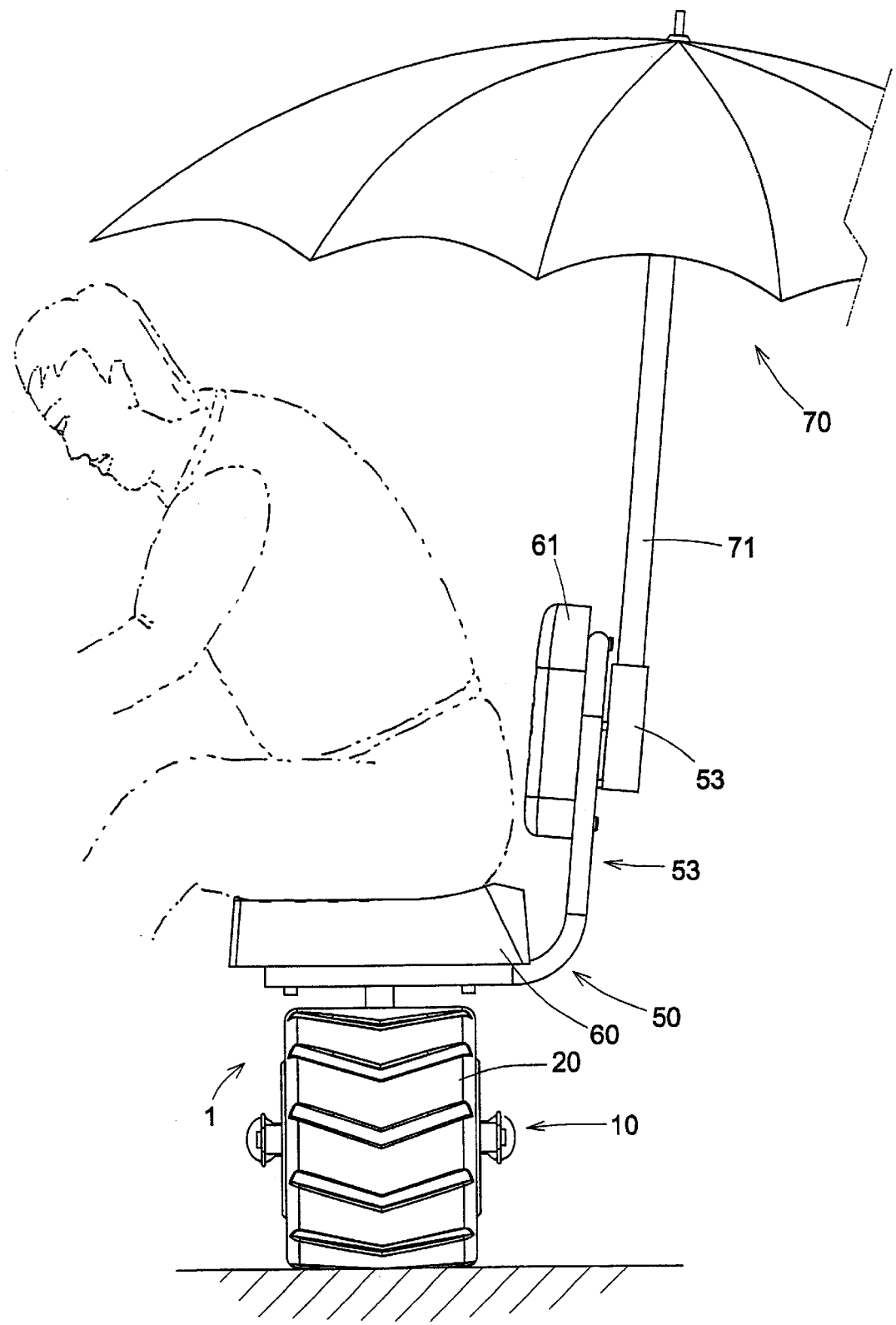
FIG. 6 is a side plan view of the gardening working vehicle structure as shown in FIG. 1 in use.

As shown in FIG. 6, a support rod 71 of a sunshade umbrella 70 may be inserted into the support tube 530 of the backrest portion 53 of the seat frame 50, thereby providing a sunshade effect to the user during work.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A gardening working vehicle structure, comprising a vehicle frame, two wheels, and said seat frame, wherein:

the vehicle frame has two ends each respectively provided with a wheel that may be rotated to move the vehicle frame horizontally, the vehicle frame has a top face provided with a seat tube extending upward therefrom a retractable rod is adjustably mounted in the seat tube of the vehicle frame, a quick release set is mounted on an outer periphery of a top portion of the seat tube of the vehicle frame for clamping and releasing the retractable rod, the retractable rod is formed with an annular stop flange for supporting said seat frame;

the seat frame is mounted on the retractable rod, and has a first section formed with a horizontal support portion, and a second section formed with a vertical backrest portion, the support portion of the seat frame is provided with a mounting tube which is mounted on a top portion of the retractable rod and rested on the stop flange of the retractable rod, so that the seat frame may be rotated on the retractable rod freely.

2. The gardening working vehicle structure in accordance with claim 1, wherein the retractable rod has a first end formed with a first insertion portion inserted into the seat tube of the vehicle frame, and has a second end formed with a second insertion portion inserted into the mounting tube of the support portion of the seat frame, and the stop flange is located between the first insertion portion and the second insertion portion.

3. The gardening working vehicle structure in accordance with claim 1, wherein the seat frame includes a tube body that is bent into an inverted U-shaped frame, and a base plate is secured on the support portion of the tube body of the seat frame.

4. The gardening working vehicle structure in accordance with claim 1, further comprising a support tube secured on the backrest portion of the seat frame.

5. The gardening working vehicle structure in accordance with claim 1, further comprising a seat pad secured on the support portion, and a backrest pad secured on the backrest portion.

* * * * *